(12) United States Patent
Forkosh et al.

(10) Patent No.: US 6,487,872 B1
(45) Date of Patent: Dec. 3, 2002

(54) DEHUMIDIFIER SYSTEM

(75) Inventors: Mordechai Forkosh, Haifa; Dan Forkosh, Atlit; Tomy Forkosh, Haifa, all of (IL)

(73) Assignee: Drykor Ltd., Atlit (IL)

( * ) Notice: Subject to any disclaimer, the term of this patent is extended or adjusted under 35 U.S.C. 154(b) by 0 days.

(21) Appl. No.: 09/554,397

(22) PCT Filed: Nov. 11, 1998

(86) PCT No.: PCT/IL98/00552

§ 371 (c)(1),
(2), (4) Date: May 15, 2000

(87) PCT Pub. No.: WO99/26026

PCT Pub. Date: May 27, 1999

(51) Int. Cl.⁷ ............................................... F25D 23/00
(52) U.S. Cl. ................................ 62/271; 62/262; 62/94
(58) Field of Search ............................ 62/262, 271, 94

(56) References Cited

U.S. PATENT DOCUMENTS

| | | |
|---|---|---|
| 2,672,024 A | 3/1954 | McGrath |
| 2,798,570 A | 7/1957 | Kelley |
| 2,952,993 A | 9/1960 | Bosworth, Jr. |
| 4,259,849 A | 4/1981 | Griffiths |
| 4,373,347 A | 2/1983 | Howell et al. |
| 4,430,864 A | 2/1984 | Mathiprakasam |
| 4,635,446 A | 1/1987 | Meckler |
| 4,691,530 A | 9/1987 | Meckler |
| 4,700,550 A | 10/1987 | Rhodes |
| 4,723,417 A | 2/1988 | Meckler |
| 4,819,444 A * | 4/1989 | Meckler ...................... 62/238 |
| 4,887,438 A | 12/1989 | Meckler |
| 4,905,479 A | 3/1990 | Wilkinson |
| 4,910,971 A | 3/1990 | McNab |
| 4,939,906 A | 7/1990 | Spatz et al. |
| 4,941,324 A | 7/1990 | Peterson et al. |
| 4,955,205 A * | 9/1990 | Wilkinson ...................... 62/94 |
| 4,984,434 A | 1/1991 | Howell et al. |
| 4,987,750 A | 1/1991 | Meckler |
| 5,020,334 A | 6/1991 | Wilkinson |
| 5,022,241 A | 6/1991 | Wilkinson |
| 5,058,394 A | 10/1991 | Wilkinson |
| 5,070,703 A * | 12/1991 | Wilkinson ...................... 62/94 |
| 5,191,771 A * | 3/1993 | Meckler ...................... 62/271 |
| 5,197,299 A * | 3/1993 | Sohn et al. ................... 62/262 |
| 5,213,154 A | 5/1993 | Marsala et al. |
| 5,297,398 A | 3/1994 | Meckler |
| 5,351,497 A | 10/1994 | Lowenstein |
| 5,471,852 A * | 12/1995 | Meckler ...................... 62/271 |
| 5,582,025 A * | 12/1996 | Dubin et al. ................... 62/262 |
| 6,018,954 A | 2/2000 | Assaf |
| 6,134,903 A | 10/2000 | Potnis et al. |
| 6,138,470 A * | 10/2000 | Potnis et al. ................... 62/271 |

FOREIGN PATENT DOCUMENTS

| | | |
|---|---|---|
| EP | 0 397 458 | 5/1989 |
| WO | WO 96 33378 A | 10/1996 |
| WO | WO 99/22180 | 5/1999 |

* cited by examiner

Primary Examiner—William Doerrler
Assistant Examiner—Mark Shulman
(74) Attorney, Agent, or Firm—Fenster & Company Patent Attorneys Ltd.

(57) ABSTRACT

A dehumidifier system (10) comprising: a dehumidifying chamber (12) into which moist air is introduced and from which less moist air is removed after dehumidification; a desiccant solution (28) situated in at least one reservoir (30); a first conduit (13) via which desiccant solution (28) is transferred from the at least one reservoir (30) to the dehumidifying chamber (12), said solution being returned to said at least one reservoir (30) after absorbing moisture from the moist air; a regenerator (32) which receives desiccant solution from said at least one reservoir and removes moisture from it; a second conduit via which desiccant is transferred from the at least one reservoir (30) to the regenerator (32), said solution being returned to said at least one reservoir after moisture is removed from it; and a heat pump (44) that transfers heat from the solution in the first conduit to the solution in the second conduit.

40 Claims, 4 Drawing Sheets

DEHUMIDIFIER SYSTEM

FIELD OF INVENTION

This invention is in the field of dehumidification and in particular is concerned with improved efficiency of desiccant type dehumidifiers.

BACKGROUND OF INVENTION

Large scale air dehumidifying systems based on a desiccating agent are associated with two main problems. One problem is that the dried air output is warmer than the moist air input. This result is caused by the heating of the air from latent heat of evaporation as the moisture is removed therefrom and also, to a lesser degree by the heating of the air by transfer of heat from the generally warmer desiccant. A second problem is that regeneration of the desiccant requires considerable energy.

Dehumidifying systems based on liquid desiccants dehumidify air by passing the air through a tank filled with desiccant. The moist air enters the tank via a moist air inlet and dried air exits the tank via a dried air outlet. In one type of desiccant system a shower of desiccant from a reservoir is sprayed into the tank and, as the desiccant droplets descend through the moist air, they absorb water from it. The desiccant is then returned to the reservoir for reuse. This causes an increase in the water content of the desiccant.

Water saturated desiccant accumulates in the reservoir and is pumped therefrom to a regenerator unit where it is heated to drive off its absorbed water as vapor. Regenerated desiccant, which heats up in this process, is pumped back into the reservoir, for reuse. Since the water absorption process leads to heating of the air and the regeneration process heats the desiccant, substantial heating of the air takes place during the water absorption process.

An example of a device using a circulating hygroscopic liquid such as a LiCl desiccant is described in U.S. Pat. No. 4,939,906. In this patent a boiler is provided with finned tubes for the flow of the heated desiccant. This patent also discloses pre-heating the saturated desiccant before it enters the boiler for final regeneration by direct transfer of heat thereto from desiccant leaving the tank.

Other variations of systems using re-circulated desiccant solutions for dehumidifying air are shown in U.S. Pat. Nos. 4,635,446, 4,691,530 and 4,723,417. Many of these systems utilize transfer of heat from one portion of the dehumidifier to another to improve its efficiency.

In general, regeneration of the liquid desiccant requires its heating with the concomitant expenditure of energy.

SUMMARY OF INVENTION

The present invention, in some embodiments thereof, is designed to utilize heat transfer in a new way in the process of regenerating its liquid desiccant thereby enhancing the overall efficiency of the system.

In a preferred embodiment of the invention a heat pump extracts heat from liquid desiccant, preferably in a humidity collector unit and transfers the heat to a heating coil in a regenerator unit thereby reducing the overall energy required by the system. In addition, this transfer of energy has the effect of cooling the desiccant which contacts the moist air that enters the system. Thus, dry air which exits the system is cooler than it would be in the absence of the heat transfer.

In addition, in preferred embodiments of the invention, heat energy in one or more of moisture laden air which exits the regenerator, heated desiccant which exits the regenerator and air which exits the dehumidifier is used to heat the desiccant to be regenerated either on its way to or in the regenerator tank.

According to an aspect of some preferred embodiment of the invention, a dehumidifier is provided in which the relative humidity of treated air is self regulating, such that the relative humidity of the air exiting the dehumidifier remains relatively constant as the temperature or humidity of the air entering the dehumidifier drops. The air temperature of the exiting air preferably depends on the input air conditions, with the exit air temperature dropping with lower input temperature/relative humidity. There is thus provided, in accordance with a preferred embodiment of the invention, a dehumidifier system comprising:

- a dehumidifying chamber into which moist air is introduced and from which less moist air is removed after dehumidification;
- a desiccant solution situated in at least one reservoir;
- a first conduit via which desiccant solution is transferred from the at least one reservoir to the dehumidifying chamber, said solution being returned to said at least one reservoir after absorbing moisture from the moist air;
- a regenerator which receives desiccant solution from said at least one reservoir and removes moisture from it;
- a second conduit via which desiccant is transferred from the at least one reservoir to the regenerator, said solution being returned to said at least one reservoir after moisture is removed from it; and
- a heat pump that transfers heat from the solution in the first conduit to the solution in the second conduit.

Preferably, the heat pump comprises a first heat exchanger which receives heat from the solution in the first conduit, a second heat exchanger that receives heat from the solution in the second conduit and a compressor.

Preferably, the regenerator comprises a regenerator chamber in which moisture is removed from the solution by contact with air that is brought into the chamber. Preferably, the compressor is cooled by said air prior to its entry into the regenerator chamber, such that the moisture removal ability of the air is increased.

In a preferred embodiment of the invention, the heat pump includes an additional heat exchanger which transfers heat from a refrigerant after the refrigerant leaves the second heat exchanger. Preferably, the regenerator comprises a regenerator chamber in which moisture is removed from the solution by contact with air that is brought into the chamber. Preferably, the additional heat exchanger is cooled by said air prior to its entry into the regenerator chamber, such that the moisture removal ability of the air is increased.

In a preferred embodiment of the invention, the system includes a control that controls the amount of heat transferred by the heat pump.

In a preferred embodiment of the invention, the at least one reservoir comprises a first reservoir from which solution is transferred via the first conduit and a second reservoir from which solution is transferred via the second conduit. Preferably, a substantial temperature differential is maintained between the first and second reservoirs.

Preferably, the system includes a conduit that connects the first and second reservoirs, such that the level of solution in them is substantially the same.

There is further provided, in accordance with a preferred embodiment of the invention, a dehumidifier system comprising:

a dehumidifying chamber into which moist air is introduced and from which less moist air is removed after dehumidification;

a desiccant solution situated in a first reservoir;

a first conduit via which desiccant solution is transferred from the first reservoir to the dehumidifying chamber, said solution being returned to said at least one reservoir after absorbing moisture from the moist air;

a desiccant solution situated in a second reservoir;

a regenerator which receives desiccant solution from the second reservoir and removes moisture from it;

a second conduit via which desiccant is transferred from the second reservoir to the regenerator, said solution being returned to said second reservoir after moisture is removed from it; and wherein a substantial temperature differential is maintained between the first and second reservoirs.

Preferably, the system includes a conduit connecting the first and second reservoirs such that the level of solution in them is substantially the same.

Preferably, the conduit provides for only limited mixing between the two reservoirs such that the substantial temperature differential is maintained between them. Preferably, the temperature differential is at least 5° C., such as at least 10° C. or at least 15° C.

Preferably, the system includes means for providing an additional limited amount of mixing between the two reservoirs.

There is further provided, in accordance with a preferred embodiment of the invention, an air modifying device, including:

an enclosure including apparatus for modifying air entering the apparatus via an air inlet and having an air outlet for the modified air;

a first conduit having an entrance for air and an exit communicating with the inlet;

a second conduit having an exit and an entrance communicating with the outlet; and a mounting surface adapted for mounting the device on a partition such that the enclosure is on a first side of the partition and the entrance to the first conduit and the exit from the second conduit are situated on a second side of the partition.

Preferably, the conduits carry air from the first side of the partition to the second side of the partition. Preferably, the mounting surface is adapted for mounting on a window sill and the system includes a seal around the conduits that seals the first side of the partition from the second side of the partition when a window is closed on the conduits.

In a preferred embodiment of the invention, the apparatus for modifying air is a dehumidifier.

In a preferred embodiment of the invention, the apparatus for modifying air is an air conditioner including a heat pump that cools air entering the inlet by contact with a cold surface of the heat pump.

In a preferred embodiment of the invention, the apparatus for modifying air is a combination dehumidifier and an air conditioner including a heat pump that cools air entering the inlet by contact with a cold surface of the heat pump.

In a preferred embodiment of the invention, the dehumidifier is a dehumidifier system as described herein.

BRIEF DESCRIPTION OF DRAWINGS

The present invention will be more clearly and fully understood from the following detailed description of the preferred embodiments thereof, in which the same reference numerals in different drawings correspond to the same features, read in conjunction with the drawings in which.

DETAILED DESCRIPTION OF PREFERRED EMBODIMENTS

Figure 1:
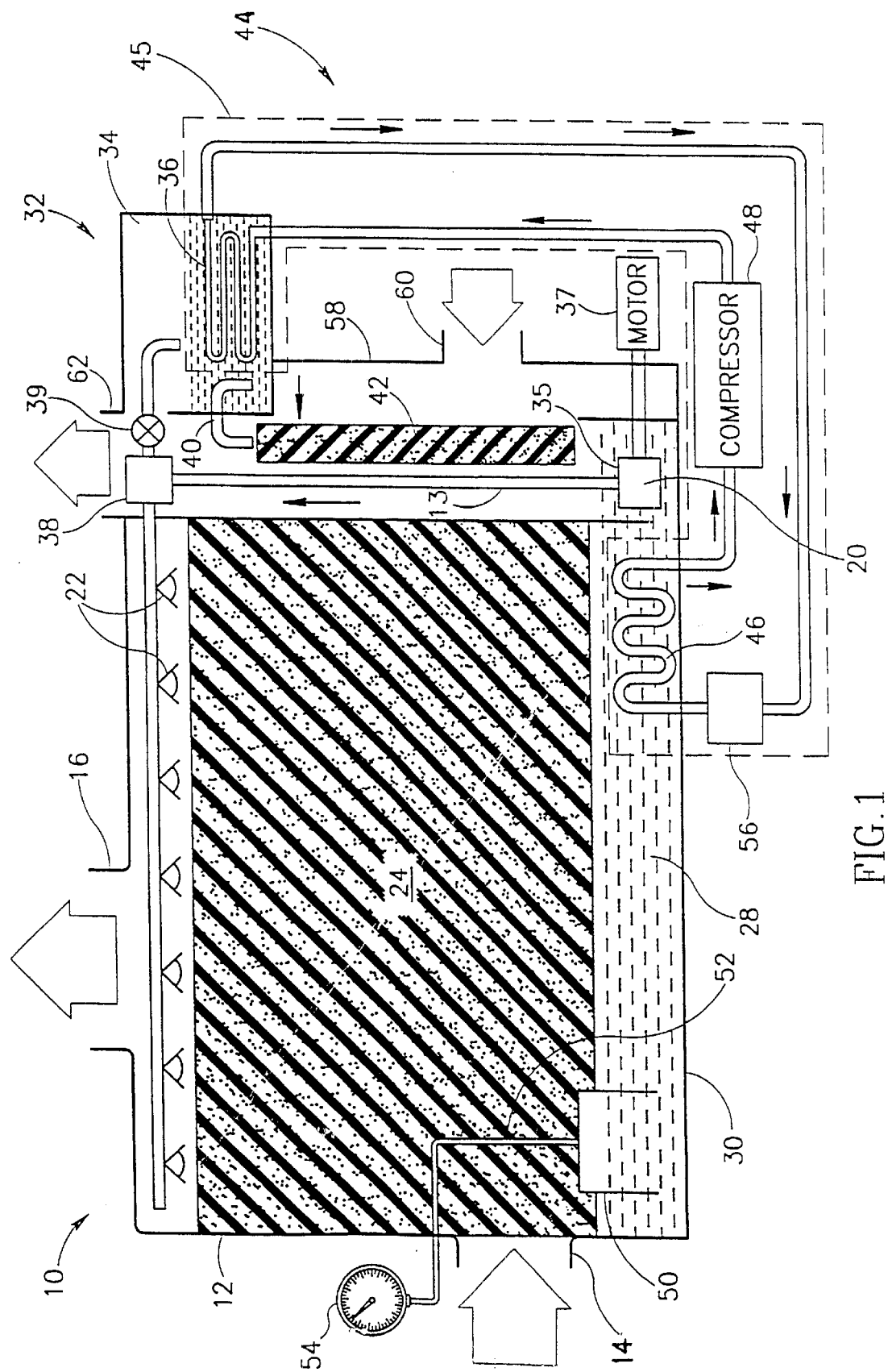
FIG. 1 schematically shows a dehumidifier unit, in accordance with a preferred embodiment of the invention.

A dehumidifying system 10, in accordance with a preferred embodiment of the invention comprises, as its two main sections a dehumidifying chamber 12 and a regenerator unit 32. Moist air enters dehumidifying chamber 12 via a moist air inlet 14 and dried air exits chamber 12 via a dry air outlet 16.

In a preferred embodiment of the invention, desiccant 28 is pumped by a pump 20 from a desiccant reservoir 30 via a pipe 13 to a series of nozzles 22. These nozzles shower a fine spray of the desiccant into the interior of chamber 12, which is preferably filled with a cellulose sponge material 24 such as is generally used in the art for such purposes. The desiccant slowly percolates downward through the sponge material into reservoir 30. Moist air entering the chamber via inlet 14 contacts the desiccant droplets. Since the desiccant is hygroscopic, it absorbs water vapor from the moist air and drier air is expelled through outlet 16. Preferably, reservoir 30 is located on the bottom of chamber 12 so that the desiccant from sponge 24 falls directly into the reservoir.

In a preferred embodiment of the invention, a pump 35 and associated motor 37 pump desiccant from an extension of reservoir 30 into pipe 13. A divider 38 receives desiccant from pipe 13 and sends part of the desiccant to nozzles 22 and part to regenerator unit 32. A valve or constriction 39 (preferably a controllable valve or constriction) may be provided to control the proportion of the desiccant which is fed to regenerator 32. If a controllable valve or constriction is used, the amount of desiccant is preferably controlled in response to the amount of moisture in the desiccant.

Chamber 34 includes a heat exchanger 36 which heats the desiccant to drive off part of the water vapor it has absorbed, thus regenerating it.

Regenerated liquid desiccant is transferred back to reservoir 30 via a pipe 40 and a tube 42 of sponge material such as that which fills chamber 12. Tube 40 is preferably contained in a chamber 58 which has an inlet 60 and an outlet 62. Air, generally from outside the area in which the air is being modified, enters the chamber via inlet 60 and carries away additional moisture which is evaporated from the still hot desiccant in tube 42, the air exiting at exit 62 carries away this moisture and also moisture which was removed from the desiccant in the regenerator. Preferably a fan (not shown) at exit 62 sucks air from chamber 58.

Alternatively or additionally, heat is transferred from the regenerated liquid desiccant to the desiccant entering or in the regenerator by bringing the two desiccant streams into thermal (but not physical) contact in a thermal transfer station (not shown). Alternatively or additionally, a heat pump may be used to transfer additional energy from the cooler desiccant leaving the regenerator to the hotter desiccant entering the regenerator, such that the desiccant returning to the reservoir is actually cooler than the desiccant which enters the chamber 34.

In a preferred embodiment of the invention, a heat pump system 44 is provided which extracts heat from the desiccant in reservoir 30 to provide energy to heat exchanger 36. Preferably, this heat pump includes (in addition to exchanger 36 which is the condenser of the system) a second heat exchanger 46 in reservoir 30, which is the evaporator of the system, and an expansion valve 56. This transfer of energy results in a reduced temperature of the desiccant which contacts the air being dried thus reducing the temperature of the dried air. Second, this transfer of energy reduces the overall requirement of energy for operating the regenerator, generally by up to a factor of 3. Since the energy utilized by the regeneration process is the major energy requirement for the system, this reduction in energy usage can have a major effect on the overall efficiency of the system. Additionally, this method of heating of the desiccant in the regenerator may be supplemented by direct heating, utilizing a heating coil.

It should be understood that the proportion of water vapor in the desiccant in reservoir 30 and in the regenerated desiccant must generally be within certain limits, which limits depend on the particular desiccant used. A lower limit on the required moisture level is that needed to dissolve the desiccant such that the desiccant is in solution in the moisture. However, when the moisture level is too high, the desiccant becomes inefficient in removing moisture from the air which enters chamber 12. Thus, it is necessary that the moisture level be monitored and controlled. It should be noted that some desiccants are liquid even in the absence of absorbed moisture. The moisture level in these desiccants need not be so closely controlled. However, even in these cases the regeneration process (which uses energy) should only be performed when the moisture level in the desiccant is above some level.

This monitoring function is generally performed by measurement of the volume of desiccant, which increases with increasing moisture. A preferred method of measuring the volume of liquid in the reservoir is by measurement of the pressure in an inverted vessel 50 which has its opening placed in the liquid in the reservoir. A tube 52 leads from vessel 50 to a pressure gauge 52. As the volume of desiccant increases from the absorption of moisture, the pressure measured by gauge 52 increases. Since the liquid in the chamber and in the regenerator is fairly constant, this gives a good indication of the amount of desiccant and thus of the amount of moisture entrained in the desiccant. When the moisture level increases above a preset value, the heat in chamber 34 is turned on. In a preferred embodiment of the invention, when the moisture level falls below some other, lower preset value, the heater is turned off.

Other factors which may influence the cut-in and cut-out points of the regeneration process are the temperature of the dry air, the regeneration efficiency and the heat pump efficiency. In some preferred embodiments of the invention, especially in cold air systems (as for ice-skating rinks) it may be advisable to provide some direct heating of desiccant in the regeneration process.

In other preferred embodiments of the invention heat pumps or other heat transfer means (not shown for simplicity) are provided to transfer heat from the dried air exiting chamber 12 and or from the heated moist air leaving regenerator chamber 34, to heat the desiccant on its way to or in chamber 34. If heat pumps are used, the source of the heat may be at a temperature lower than the desiccant to which it is transferred.

It should be understood that cooling of the desiccant in the reservoir can result in dried air leaving the dehumidifier which has the same, or preferably a lower temperature than the moist air entering the dehumidifier, even prior to any additional optional cooling of the dry air. This feature is especially useful where the dehumidifier is used in hot climates in which the ambient temperature is already high.

As indicated above, one of the problems with dehumidifier systems is the problem of determining the amount of water in the desiccant solution so that the dehumidifier solution water content may be kept in a proper range.

Figure 2:
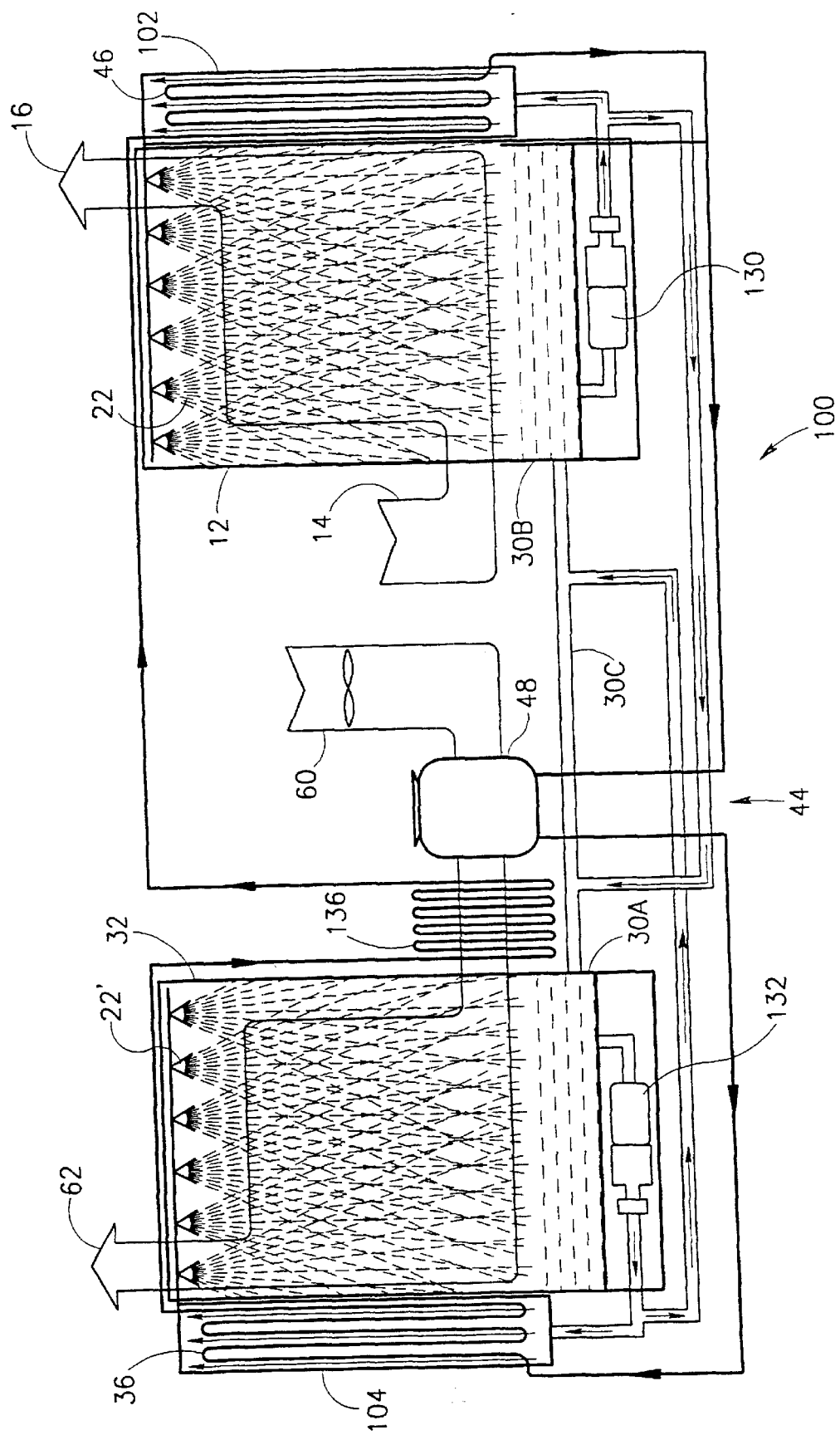
FIG. 2 schematically shows a second dehumidifier unit, in accordance with an alternative preferred embodiment of the invention.

A dehumidifier 100, in accordance with a preferred embodiment of the present invention, is shown in FIG. 2. This dehumidifier is self regulating with respect to water content of the desiccant solution and thus does not require any measurement of the volume or water content of the desiccant solution. Furthermore, the dehumidifier operates until a predetermined humidity is reached and then ceases to reduce the humidity, without any controls or cut-offs.

Dehumidifier 100 is similar to dehumidifier 10 of FIG. 1, with several significant differences. First, the system does not require any measurement of water content and thus does not have a volumetric measure for the desiccant. However, such a measurement may be provided as a safety measure if the solution becomes too concentrated.

Second, the heat pump transfers heat between two streams of desiccant solution being transferred from reservoir 30 (which is conveniently divided into two portions 30A and 30B connected by pipes 30C), namely a first stream being pumped to nozzles 22 by a pump system 130, via a conduit 102 and a second stream being pumped to regenerator unit 32 by a pump system 132, via a conduit 104.

Preferably, pipes 30C (including the bypass pipes shown) are designed so that its major effect is to generate a common level of the solution in portions 30A and 30B. In general, it is desirable that the two reservoir portions have different temperatures. This necessarily results in different concentrations of desiccant. However, it is considered generally desirable to provide some mixing between the sections, by some pumping via the bypass pipes shown so as to transfer moisture from one portion to the other. In a preferred embodiment of the invention a temperature differential of 5° C. or more is maintained, more preferably, 10° C. or more and most preferably 15° C. or even more. Thus, in a preferred embodiment of the invention, reservoir portion 30A is at a temperature of 30° C. or more and reservoir portion 30B is at a temperature of 15° C. or less.

In FIG. 2, a different construction for regenerator unit 32 is shown, which is similar to that of the dehumidifier section. Furthermore, in FIG. 2, neither section has a cellulose sponge material, which may be present or absent from either the embodiment of FIG. 1 or that of FIG. 2.

In a preferred embodiment of the invention, applicable to either FIGS. 1 or 2, spray nozzles are not used. Rather, the spray nozzles are replaced by a dripper system from which liquid is dripped on the cellulose sponge to continuously wet the sponge.

Figure 3:
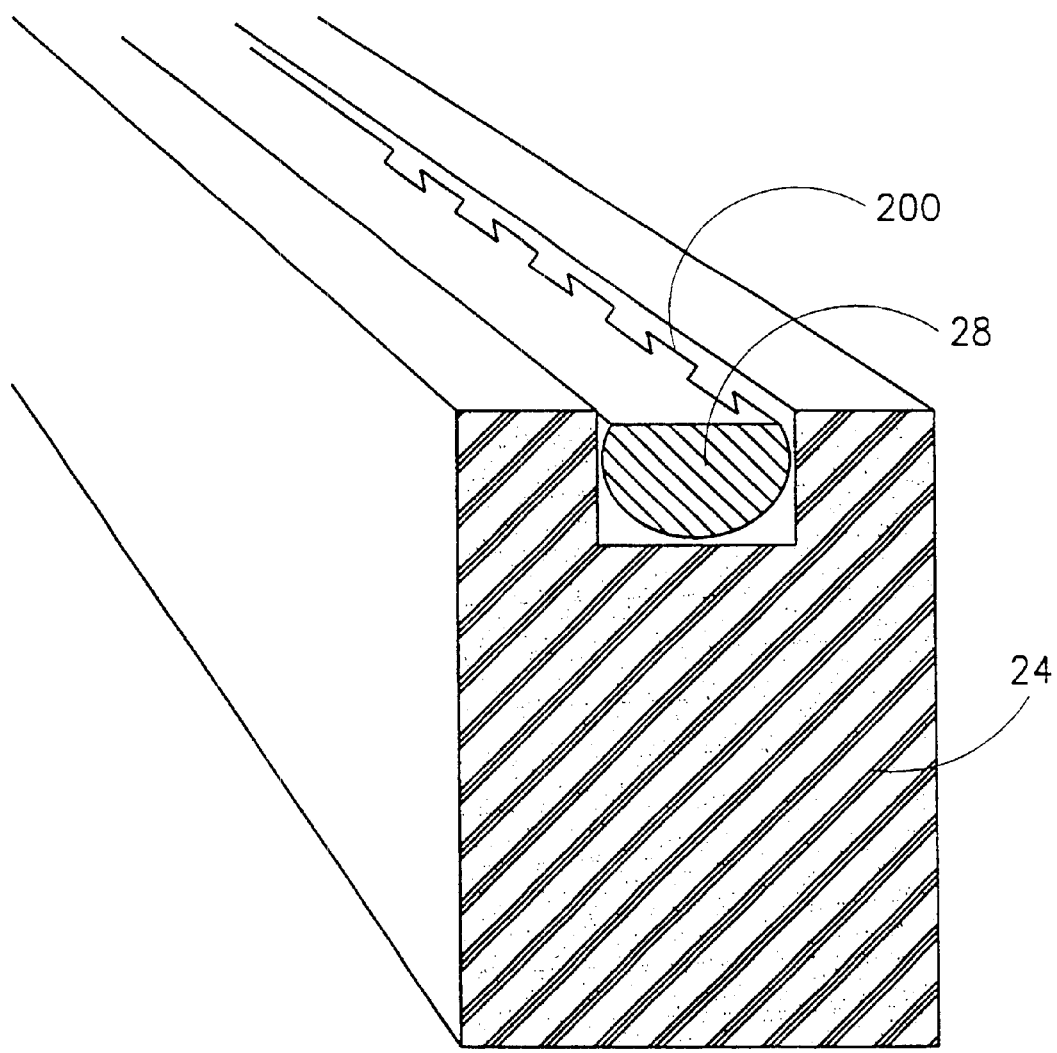
FIG. 3 schematically shows a system for wetting a sponge with desiccant solution, in accordance with a preferred embodiment of the invention.

FIG. 3 shows a preferred embodiment of a dripper system for wetting sponge 24. In this system an open conduit 200, preferably in the form of a serrated half-pipe is filled with desiccant solution 28. The desiccant solution flow through serrations along the length of the conduit and uniformly wets the sponge. In most instances the use of a sponge, without spray is preferred since the use of a spray results in dispersion of desiccant solution in the air, which must be remover therefrom. Other methods of wetting sponge 24 will occur to persons of skill in the art and any such method may be used in the practice of the invention.

Returning to FIG. 2, heat pump system 44 extracts heat from the desiccant solution in conduit 102 and transfers it to the desiccant in conduit 104. Heat pump system 44 preferably contains, in addition to the components contained in the embodiment of FIG. 1, an optional heat exchanger 136 to transfer some of the heat from the refrigerant leaving heat exchanger 104 to the regenerating air. Preferably, the compressor is also cooled by the regenerating air. However, when the air is very hot, additional air, not used in the regenerator, may be used for cooling the compressor and the refrigerant. Alternatively, only such air is used for such cooling.

The resultant heating of the air entering the regenerator increases the ability of the air to remove moisture from the desiccant. Heat pump 44 is set to transfer a fixed amount of heat. In a preferred embodiment of the invention, the humidity set point is determined by controlling the amount of heat transferred between the two streams.

Consider the system shown in FIG. 2, with the air entering dehumidifier chamber 12 at 30 degrees C. and 100% humidity. Assume further that the amount of liquid removed from the air reduces its humidity to 35% without reducing the temperature. In this situation, the amount of heat transferred between the streams of desiccant solution would be equal to the heat of vaporization of the water removed from the air, so that the temperature of the desiccant solution falling into reservoir 20 from chamber 12 is at the same temperature as that which enters it, except that it has absorbed a certain amount of moisture from the air.

Assume further, that the regenerator is set up, such that at this same temperature and humidity, it removes the same amount of water from the desiccant solution. This may require an input of heat (additionally to the heat available from the heat pump).

Further assume that the air entering the dehumidifier chamber has a lower humidity, for example 80%. For this humidity, less liquid is removed (since the efficiency of water removal depends on the humidity) and thus, the temperature of the desiccant solution leaving the dehumidifier chamber also drops. However, since less water enters the desiccant solution from the dehumidifier chamber, the amount of water removed from the solution in the regenerator also drops. This results in a new balance with less water removed and the desiccant solution at a lower temperature. A lower temperature desiccant results in cooler air. Thus, the temperature of the exiting air is also reduced. However, the relative humidity remains substantially the same. It should be understood that a reduction of input air temperature has substantially the same effect.

In a preferred embodiment of the invention, the system is self regulating, with the dehumidifying action cutting off at some humidity level. The humidity level at which this takes place will depend on the capacity of the solution sprayed from nozzles 22 to absorb moisture and the ability of the solution and on the capacity of the solution sprayed from nozzles 22' to release moisture.

In general as the air at inlet 14 becomes less humid (relative humidity) the dehumidifier becomes less able to remove moisture from it. Thus, the solution is cooled on each transit through the conduit 102 and the percentage of desiccant in the solution in 30B reaches some level. Similarly, as less moisture is removed from the air, the solution in 30A becomes more concentrated and less moisture is removed from it (all that happens is that it gets heated. At some point, both removal and absorption of moisture by the solution stop since they respective sprayed solution is stability with the air to which or from which moisture is transferred.

It should be understood that this humidity point can be adjusted by changing the amount of heat transferred between the solutions in conduits 102 and 104. If greater heat is transferred, the transfer ability of both the dehumidifying chamber and the regenerator are increased and the humidity balance point is lowered. For less heat pumped, a higher humidity will result. In addition, the set-point will depend somewhat on the relative humidity of the air entering the regenerator.

Figure 4:
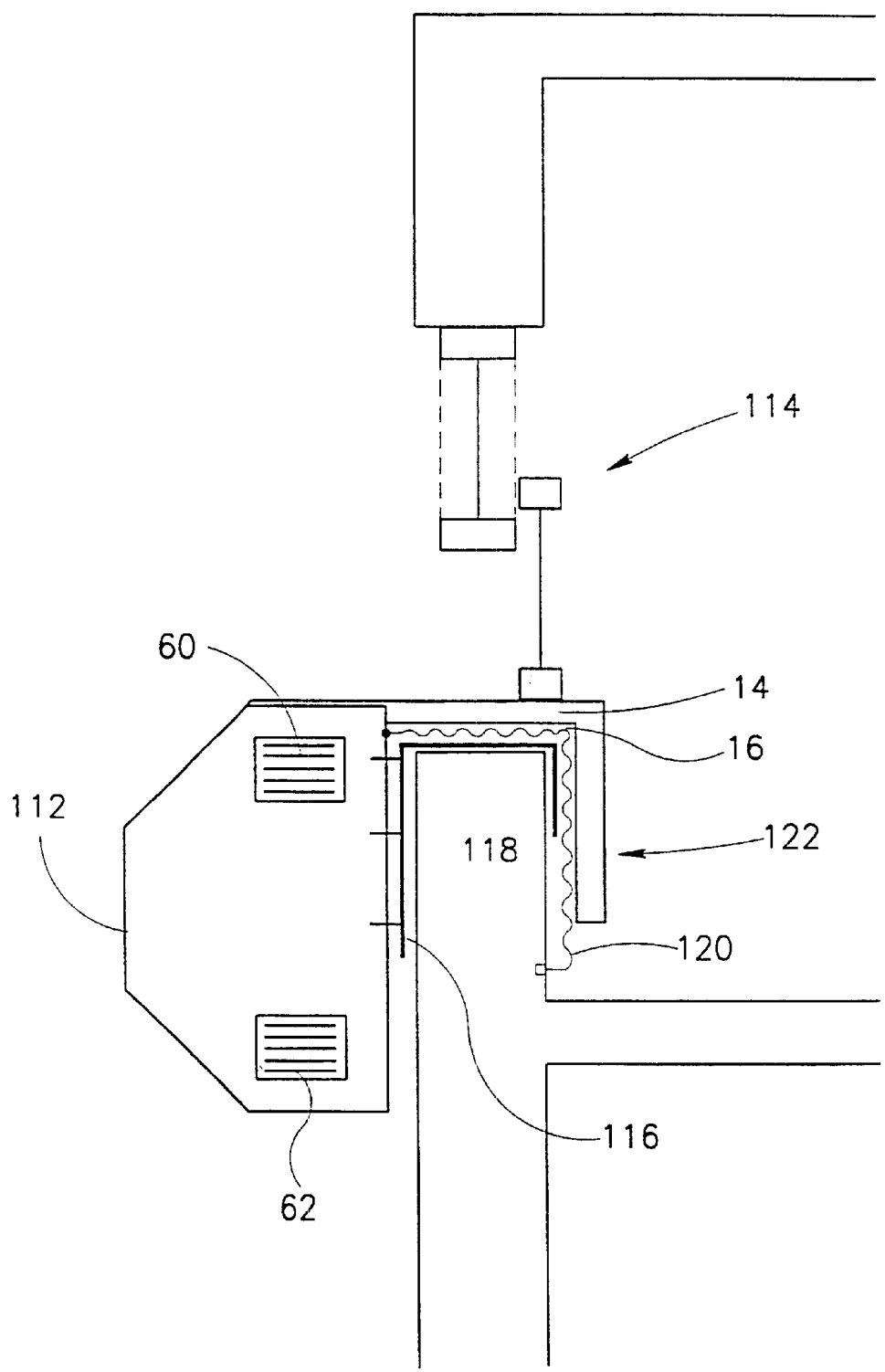
FIG. 4 shows a preferred construction for a window mounted dehumidifier unit in accordance with a preferred embodiment of the invention.

FIG. 4 schematically shows a window mounted dehumidifier system 110, in accordance with preferred embodiments of the invention. In this embodiment, the entire unit shown in FIGS. 1 or 2 is contained in an enclosure 112 which hangs outside a window 114 of a room. Preferably, system 110 further includes a U-shaped support unit which rests on window sill 118 and is firmly attached to enclosure 112. Passing through window 112 are two conduits, 14 and 15 corresponding to air inlet 14 and dehumidified air outlet 16 of FIGS. 1 and 2. The window closes on the top of the conduits to seal the room from the outside. A power cord 120, plugs into a power outlet inside the window and supplies power to the dehumidifier unit. Preferably, a panel is situated inside the window on which controls are mounted and which provides a suitable grill for inlet 14 and outlet 16. FIG. 3 also shows inlet 60 and outlet 62 used to carry away moisture laden warm air. Additionally, inlet 60 can provide a controllable amount of fresh air to the room.

In a further preferred embodiment of the invention the configuration of FIG. 4 is used for a combination air conditioner and dehumidifier or for a conventional air conditioning mechanism including a heat pump that cools air entering the inlet by contact with a cold surface of the heat pump. For an air conditioner both heat exchangers would be outside the window with air from the room being fed to the air conditioner's condenser via conduit 14 and from it via conduit 16 to the room to be cooled.

Units such as those shown in FIG. 4 provide for the low noise of split air conditioning units with the convenience of window mounting.

When used in the following claims, the terms "comprise" or "include" or their conjugates mean "including but not necessarily limited to."The present invention has been described utilizing a preferred embodiment thereof. It should be understood that many variations of the preferred embodiment within the scope of the invention, as defined in the following claims, are possible and will occur to a person of skill in the art.

What is claimed is:
1. A dehumidifier system comprising:
   a desiccant solution situated in at least one reservoir;
   a dehumidifier including a dehumidifying chamber into which moist air is introduced and from which less moist air is removed after dehumidification;
   a first conduit via which desiccant solution is transferred from the at least one reservoir to the dehumidifying chamber, said solution being returned to said at least one reservoir after absorbing moisture from the moist air;

a regenerator which receives desiccant solution from said at least one reservoir and removes moisture from it;

a second conduit via which desiccant is transferred from the at least one reservoir to the regenerator, said solution being returned to said at least one reservoir after moisture is removed from it;

a refrigeration system that comprises a plurality of heat exchangers, a refrigerant and a compressor, wherein the refrigerant passes through the heat exchangers, the heat exchangers including a first heat exchanger in thermal contact with desiccant associated with said dehumidifier, a second heat exchanger in thermal contact with desiccant associated with said regenerator and a third heat exchanger that is not in contact with said desiccant; and a plurality of conduits, wherein said compressor is connected to said heat exchangers via said conduits.

2. A system according to claim 1 wherein the first heat exchanger receives heat from the solution in the first conduit, and the second heat exchanger receives heat from the solution in the second conduit.

3. A system according to claim 1 wherein the regenerator comprises a regenerator chamber in which moisture is removed from the solution by contact with air that is brought into the chamber.

4. A system according to claim 3 wherein the compressor is cooled by said air prior to its entry into the regenerator chamber, such that the moisture removal ability of the air is increased.

5. A system according to claim 2 wherein the heat pump includes an additional heat exchanger which transfers heat from a refrigerant after the refrigerant leaves the second heat exchanger.

6. A system according to claim 5 wherein the regenerator comprises a regenerator chamber in which moisture is removed from the solution by contact with air that is brought into the chamber.

7. A system according to claim 6 wherein the third heat exchanger is cooled by said air prior to its entry into the regenerator chamber, such that the moisture removal ability of the air is increased.

8. A system according to claim 1 and including a control that controls the amount of heat transferred between the first and second heat exchangers.

9. A system according to claim 1 wherein the at least one reservoir comprises a first reservoir from which solution is transferred via the first conduit and a second reservoir from which solution is transferred via the second conduit, said first reservoir forming a portion of the dehumidifier and said second reservoir forming a portion of the regenerator.

10. A system according to claim 9 and including a conduit that connects the first and second reservoirs, such that the level of solution in them is substantially the same.

11. A system according to claim 10 and including means for providing an additional limited amount of mixing between the two reservoirs.

12. A system according to claim 11 wherein the limited mixing results in a solution concentration differential between the solution in the first and second reservoirs.

13. A system according to claim 9 wherein a substantial temperature differential is maintained between the first and second reservoirs.

14. A system according to claim 13 wherein the first reservoir is maintained at a first temperature and the second reservoir is maintained at a second temperature at least 5° C. higher than the first temperature.

15. A system according to claim 13 and including a conduit that connects the first and second reservoirs, such that the level of solution in them is substantially the same.

16. A system according to claim 15 wherein the conduit provides for only limited mixing between the two reservoirs such said temperature differential is maintained between them.

17. A system according to claim 16 and including means for providing an additional limited amount of mixing between the two reservoirs.

18. A system according to claim 16 wherein the limited mixing results in a solution concentration differential between the solution in the fist and second reservoirs.

19. A dehumidifier system comprising:

a dehumidifying chamber into which moist air is introduced and from which less moist air is removed after dehumidification;

a desiccant solution, at a first temperature, situated in a first reservoir;

a first conduit via which desiccant solution is transferred from the first reservoir to the dehumidifying chamber, said solution being returned to said at least one reservoir after absorbing moisture from the moist air;

a desiccant solution, at a second temperature, said second temperature being at least 5° C. higher than the first temperature, situated in a second reservoir;

a regenerator which receives desiccant solution from the second reservoir and removes moisture from it;

a second conduit via which desiccant is transferred from the second reservoir to the regenerator, said solution being returned to said second reservoir after moisture is removed from it.

20. A system according to claim 19 and including a conduit connecting the first and second reservoirs, such that the level of solution in them is substantially the same.

21. A system according to claim 20 wherein the conduit provides for only limited mixing between the two reservoirs such said temperature differential is maintained between them.

22. A system according to claim 21 and including means for providing an additional limited amount of mixing between the two reservoirs.

23. A system according to claim 22 wherein the limited mixing results in a solution concentration differential between the solution in the first and second reservoirs.

24. A system according to claim 19 wherein the temperature differential is at least 10° C..

25. A system according to claim 24 wherein the temperature differential is at least 15° C.

26. An air modifying device including:

an enclosure including apparatus for modifying air entering the apparatus via an air inlet and having an air outlet for the modified air;

a first conduit having an entrance for air and an exit communicating with the inlet;

a second conduit having an exit and an entrance communicating with the outlet; and a mounting surface adapted for mounting the device on a partition such that the enclosure is on a first side of the partition and the entrance to the first conduit and the exit from the second conduit are situated on a second side of the partition.

27. A device according to claim 26 wherein the conduits carry air from the first side of the partition to the second side of the partition.

28. A device according to claim 27 wherein mounting surface is adapted for mounting on a window sill and including a seal around the conduits that seals the first side of the partition from the second side of the partition when a window is closed on the conduits.

29. A device according to claim 26 wherein the apparatus for modifying air is a dehumidifier.

30. A device according to claim 26 wherein the apparatus for modifying air is an air conditioner including a heat pump that cools air entering the inlet by contact with a cold surface of the heat pump.

31. A device according to claim 26 wherein the apparatus for modifying air is a combination dehumidifier and an air conditioner including a heat pump that cools air entering the inlet by contact with a cold surface of the heat pump.

32. A system according to claim 14 wherein the temperature differential is at least 10° C.

33. A system according to claim 32 wherein the temperature differential is at least 15° C.

34. A device according to claim 27 wherein the apparatus for modifying air is a dehumidifier.

35. A device according to claim 27 wherein the apparatus for modifying air is an air conditioner including a heat pump that cools air entering the inlet by contact with a cold surface of the heat pump.

36. A device according to claim 27 wherein the apparatus for modifying air is a combination dehumidifier and an air conditioner including a heat pump that cools air entering the inlet by contact with a cold surface of the heat pump.

37. A device according to claim 34 wherein mounting surface is adapted for mounting on a window sill and including a seal around the conduits that seals the first side of the partition from the second side of the partition when a window is closed on the conduits.

38. A device according to claim 33 wherein mounting surface is adapted for mounting on a window sill and including a seal around the conduits that seals the first side of the partition from the second side of the partition when a window is closed on the conduits.

39. A device according to claim 36 wherein mounting surface is adapted for mounting on a window sill and including a seal around the conduits that seals the first side of the partition from the second side of the partition when a window is closed on the conduits.

40. The system according to claim 3 wherein the compressor is situated at an entrance to the regenerator section such that outside air is heated by it prior to entering the regenerator.

* * * * *

UNITED STATES PATENT AND TRADEMARK OFFICE
CERTIFICATE OF CORRECTION

PATENT NO. : 6,487,872 B1 Page 1 of 1
DATED : December 3, 2002
INVENTOR(S) : Mordechai Forkosh et al.

It is certified that error appears in the above-identified patent and that said Letters Patent is hereby corrected as shown below:

<u>Title page,</u>
Item [56], References Cited, U.S. PATENT DOCUMENTS, add:
-- 2,690,656   10/1954      Cummings
5,791,153     8/1998       Belding et al.
5,826,641     10/1998      Bierwirth et al.
4,180,985     1/1980       Northrup --;

FOREIGN PATENT DOCUMENTS, add:
-- WO 00/55546    9/2000
WO 99/26026      5/1999
WO 99/26025      5/1999
SU 1 690 827     11/1991 --;

OTHER DOCUMENTS, add:
-- Toshikazu, M.; Patent Abstracts of Japan; Vol. 1999, No. 10; 31 August 1999; & JP 11 137948; 25 May 1999 --

Signed and Sealed this

Eleventh Day of November, 2003

JAMES E. ROGAN
*Director of the United States Patent and Trademark Office*